J. P. BACHMAN.
DOUGH MIXING MACHINE.
APPLICATION FILED APR. 28, 1915.

1,217,082.

Patented Feb. 20, 1917.
3 SHEETS—SHEET 2.

Witnesses:
John J. Kittel
Teresa V. Lynch

Inventor
Joseph P. Bachman
By his Attorney

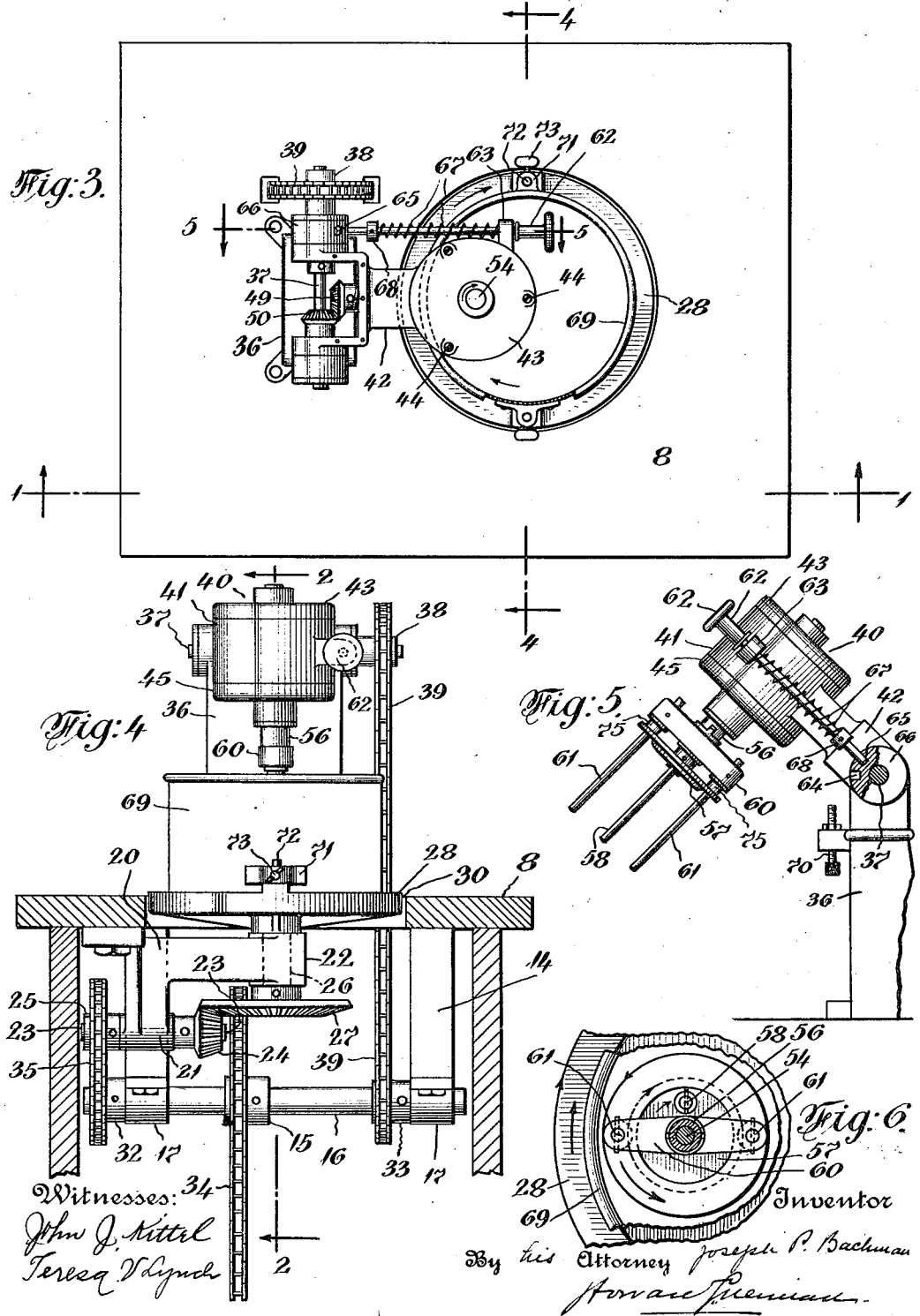

UNITED STATES PATENT OFFICE.

JOSEPH P. BACHMAN, OF NEWARK, NEW JERSEY.

DOUGH-MIXING MACHINE.

1,217,082.

Specification of Letters Patent.

Patented Feb. 20, 1917.

Application filed April 28, 1915. Serial No. 24,484.

*To all whom it may concern:*

Be it known that I, JOSEPH P. BACHMAN, a citizen of the United States, and a resident of Newark, in the county of Essex and State of New Jersey, have invented certain new and useful Improvements in Dough-Mixing Machines, of which the following is a specification.

One of the objects of my invention is a dough mixing device whereby the cutting, breaking or tearing of the dough during the mixing may be prevented.

Another object of my invention is a device whereby dough may be mixed by a thorough intermingling of the ingredients and in which the dough is mixed by a stretching or pulling operation.

Another object of my invention is a device in which the desired object is obtained by the counter-revolution of two series of agitators or stirrers in conjunction with the revolution of the dough-containing receptacle.

Another object of my invention is a device in which the various operations of sponge-forming, knocking down and dough-mixing may all be performed in the same receptacle without manual handling of the materials.

Another object of my invention is a device in which the various operations of dough producing and mixing may be performed hygienically and economically.

Another object of my invention is a device in which the glutinous ingredients of the dough are developed to a maximum amount.

Another object of my invention is a device in which the knocking down of the dough can be accomplished without cutting or breaking the dough.

Another object of my invention is a device in which the dough will not stick or adhere to the mixing or stirring means.

Another object of my invention is a device in which the stirring apparatus may be introduced into and removed from the dough-containing receptacle without disengagement of the revoluble means of the stirrers.

Other objects of the invention are evident from a consideration of its arrangements of parts and means of operation.

In the proper formation of dough for bread making purposes several operations are essential. The first operation usually consists of the formation of what is known as the sponge, which is a mixture of flour, water and yeast, thoroughly intermingled with each other and then allowed to rest for varying lengths of time, usually about four hours. During this operation the active properties of the yeast are thoroughly developed and the sponge thus formed is then added to flour, water and such other ingredients as are to be introduced into the dough. This second admixture is then stirred and allowed to stand until the dough has raised, due to the formation of the gases resulting from the chemical operations within the mass. The continued retention of these gases within the mass is deleterious to the resulting product and it is therefore necessary to break down this mass by working it in such a manner as to release the retained gases. This operation is repeated four or five times with the dough and finally the dough is thoroughly mixed and allowed to stand and treated by means of heat to produce the bread.

In the generally employed methods of producing bread dough, the sponge is formed in a receptacle and after it has attained the desired degree of efficiency it is taken out of the receptacle, usually by hand, and placed into another mixer containing the other ingredients for the dough and mixed. The breaking down process is accomplished in this mixer or is usually done by hand. As the formation of the sponge requires a number of hours and as the breaking down process has to be repeated a number of times with periods of rest of the dough between the breaking down operations, it is evident that if the sponge and the dough be retained in the mixing receptacles in conjunction with the mixing apparatus during the whole operation, that these mixing devices will be useless for a very considerable length of time, that is, during the periods when the sponge and the dough must be allowed to rest undisturbed.

The most important operation in the formation of bread and similar doughs is the proper development of the glutinous ingredients. It is by means of these glutins that the gases are properly retained in the bread, which retention under proper conditions is absolutely essential for the formation of a superior product. It has been found that these glutinous materials are highly developed when the dough is stretched and pulled continuously and is not cut or broken. By this pulling process the glutinous ingredients obtain a high degree of a stretching property and hence when the gases are formed within the bread this glutinous material stretches to a greater degree and allows a greater expansion of the dough due to the gas formation. If these glutinous materials do not possess this stretching property, they break before the gases have been properly developed, allowing the escape of the gases and materially decreasing the value of the product. On the other hand, if these glutinous materials are of a hard consistency, the force of the developed gases is not sufficient to expand them and the dough does not rise properly. It is therefore evident that the formation of these glutinous materials into a pliable and stretchable condition is of the highest importance and every effort must be expended to form these glutinous materials by pulling or stretching processes and to prevent if possible all cutting or breaking processes. The dough mixing machines generally employed break or cut the dough into pieces during the mixing operation, thus preventing the proper formation of the glutinous materials, whereas the device of this invention does not cut or break the dough but subjects it to a continuous and regular pulling or stretching operation developing the glutinous materials into the highest state of efficiency.

The device is so arranged that the sponge materials may be added to a receptacle, the receptacle introduced into the device and thoroughly stirred and the receptacle with the sponge removed therefrom. This sponge may then be allowed to form in the original receptacle and when in proper condition the other dough ingredients may be added thereto and the entire receptacle with its contents introduced into the mixing device, thoroughly mixed, removed, allowed to stand, introduced again into the mixing device, broken down by means of the agitators, removed and allowed to stand, and all of the necessary operations may thus be performed in one receptacle without interfering with the operation of the mixing device or preventing it from being continuously used. In other words, the same mixing device may be employed continuously for a series of sponge forming, dough mixing and breaking down operations.

I have found that the stretching property of the glutinous materials may be greatly enhanced, with improved results, if the dough is stretched and pulled by means of two sets of stirrers, revolving one within the other in counter-direction to each other, the dough retaining receptacle at the same time having a rotary movement. If the axis of rotation of the stirrers is different from the axis of rotation of the receptacle, thus bringing the revoluble stirrers toward one side of the receptacle, the stretching and mixing operations are increased to a high state of efficiency.

Further, by having the stirring rods rounded in form there is no tendency for the sponge or dough to become attached or affixed to the stirring mechanism which may be readily removed after each operation without the loss of time necessary for cleaning off or removing attached particles of dough.

My invention comprises in a broad way two series of revoluble stirring rods revolving in counter-direction to each other within a removable receptacle which itself has a rotary motion, the axis of rotation of the stirring rod members being relatively different from the axis of rotation of the dough containing receptacle.

In the accompanying drawings illustrating one modification of the device of my invention and in which similar parts are indicated by similar numbers:—

Fig. 3 is a top plan view.

Fig. 4 is a detailed section on the line 4—4 of Fig. 3.

Fig. 5 is a detailed view, partly in section, showing the mixing apparatus in a raised position, on the line 5—5 of Fig. 3.

Fig. 6 is a top plan view in section on the line 6—6 of Fig. 2.

Figure 1:
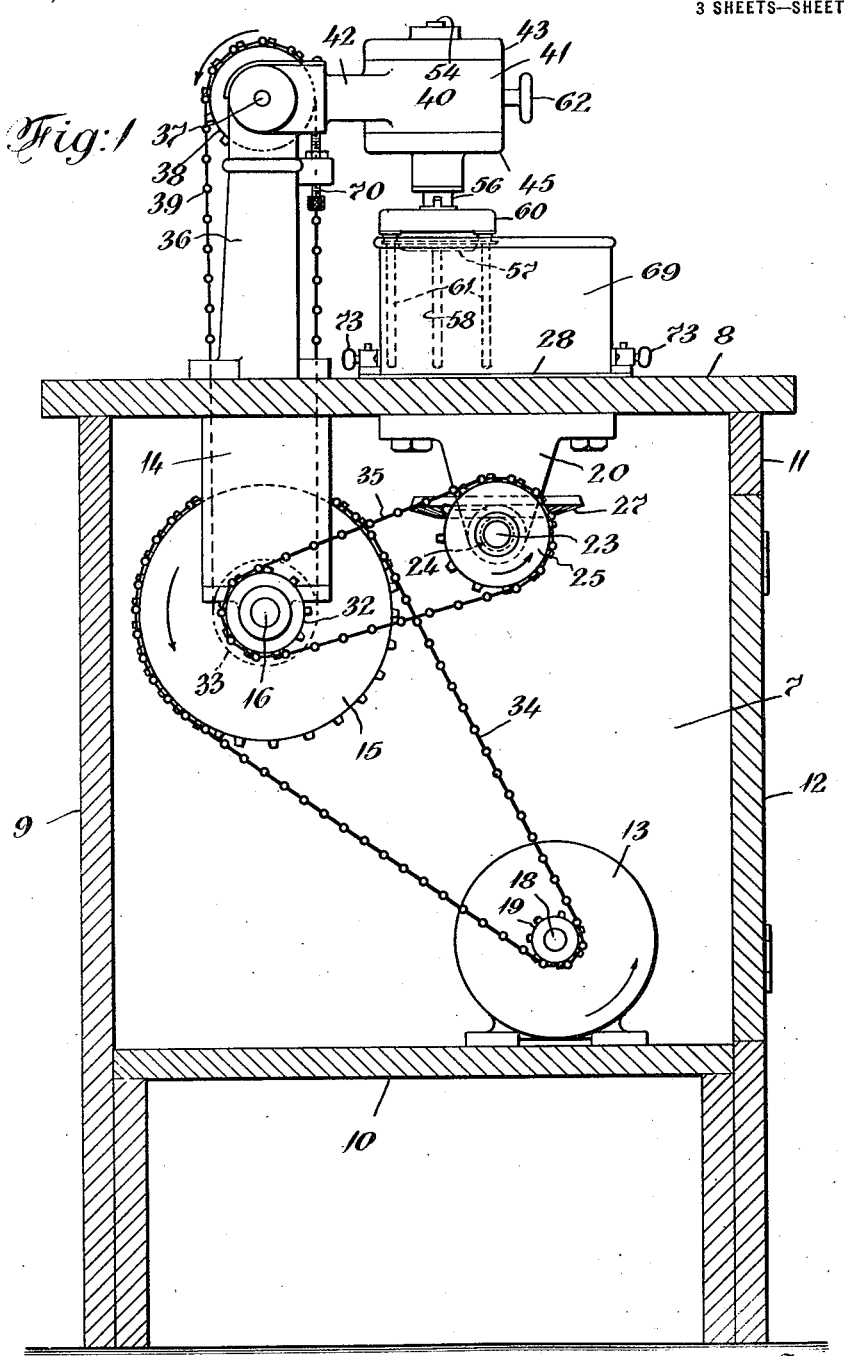
Figure 1 is an elevation in section on the line 1—1 of Fig. 3.

In the illustration 7 is a box, comprising a top member 8, a back 9, a bottom 10 and a front 11, in which is a hinged door 12 in order to allow of easy examination of the mechanism therein. To the bottom 10, a motor 13 is attached. Supported downwardly from the top 8, by means of the hanger 14 is a cogged wheel 15 rotatable with the shaft 16 within the bearings 17, 17. The motor 13 carries a shaft 18 to which is attached the cogged wheel 19. Supported downwardly from the top 8 is a bracket 20 carrying the bearings 21 and 22. Within the bearing 21 is a revoluble shaft 23, carrying a bevel gear 24 at its one extremity and a cogged wheel 25 at the other. Within the bearing 22 is a revoluble shaft 26 fixedly attached to one end of which by means of the binding screw 31 is a bevel wheel 27, meshing with the bevel wheel 24, the other end of the shaft 26 being fixedly attached to the revolution platform 28, by means of the binding screw 29, the platform 28 being situated in an opening 30 of the top 8. The revoluble shaft 16 has a cogged wheel 32 fixedly attached to one end, and a cogged wheel 33 fixedly attached to it at a position near to the other end. The cogged wheels 19 and 15 are connected by the linked chain 34, and the cogged wheels 32 and 25 are connected by the linked chains 35.

The top 8 carries a support 36, the upper portion of which carries a shaft 37 rotatable within bearings in the support 36. The shaft 37 has a cogged wheel 38 fixedly attached to it at one end, the cogged wheels 38 and 33 being connected by the linked belt 39. The casement 40 is comprised of a circular inclosing side member 41, which is revolubly attached to the shaft 37 by the extended branched member 42, a top member 43 removably attached to the side member 41 by means of the screws 44, 44, and a bottom member 45 similarly attached to the side member 41 by means of the screws 46, 46. The bearing 47 in the member 41 carries a revoluble horizontal shaft 48, to one end of which is fixedly attached a bevel gear 49 meshing with the bevel gear 50, which is fixedly attached to the shaft 37. The other end of the shaft 48, carries a bevel gear 51 fixedly attached thereto, and meshing with the bevel gears 52 and 53. The bevel gear 52 is fixedly attached to the vertical shaft 54 by means of the pin 55 and is revolubly situated in a bearing in the top casement member 43 and in a revoluble bearing 56. The lower extremity carries a fixedly attached circular member 57, a round stirring rod 58 extending downwardly from and carried by the member 57. The revoluble tubular member 56 incloses the shaft 54, and has the bevel gear 53 fixedly attached to its upper end by means of the set screw 59, the lower end of the member 56 being fixedly attached to the yoke or arm 60, through which the shaft 54 extends. A ring 75 separates the circular member 57 from the arm 60. From each end of the arm 60 a round stirring rod 61 extends downwardly, being fixedly attached thereto and passing through the ring 75.

Attached to the side of the casement 40 is a push rod 62 slidable within the bearing 63, and capable of adjustment into the two recesses 64, 65 of the collar 66 which is fixedly attached to the shaft 37. A spiral spring 67 between the bearing 63 and the fixed nut 68 retains the push rod 62 in the recesses 64, 65. The casing 40 with its attached members may thus be raised to an elevated position freeing it from the receptacle 69 and retaining it in that position by means of the push rod 62 within the recess 65. When in its normal position the push rod 62 is within the recess 64.

It will thus be seen that the stirring mechanism may be inserted into and removed from the dough-mixing receptacle without causing the bevel gears 49 and 50 to become unmeshed. This is a valuable feature, as it is both more expedient and efficient than is a means for raising the stirrers which involves the disengagement of these two gears, with the incident trouble of engaging them properly when the stirrers are returned into the receptacle.

The screw bolt 70 is threaded with the support 36, and is designed to sustain the casement 40 at any desired distance from the bottom of the receptacle 69.

The circular dough-containing receptacle 69 carries oppositely situated perforated lugs 71, 71, through which the studs 72, 72 of the platform 28 may be inserted and fixedly attached by means of the set screws 73, 73.

It is evident that this dough-containing receptacle may be readily mounted upon wheels, thus allowing of its placement upon or removal from the revoluble platform 28, and that other fastening means may be employed to attach the receptacle and platform to each other.

Figure 2:
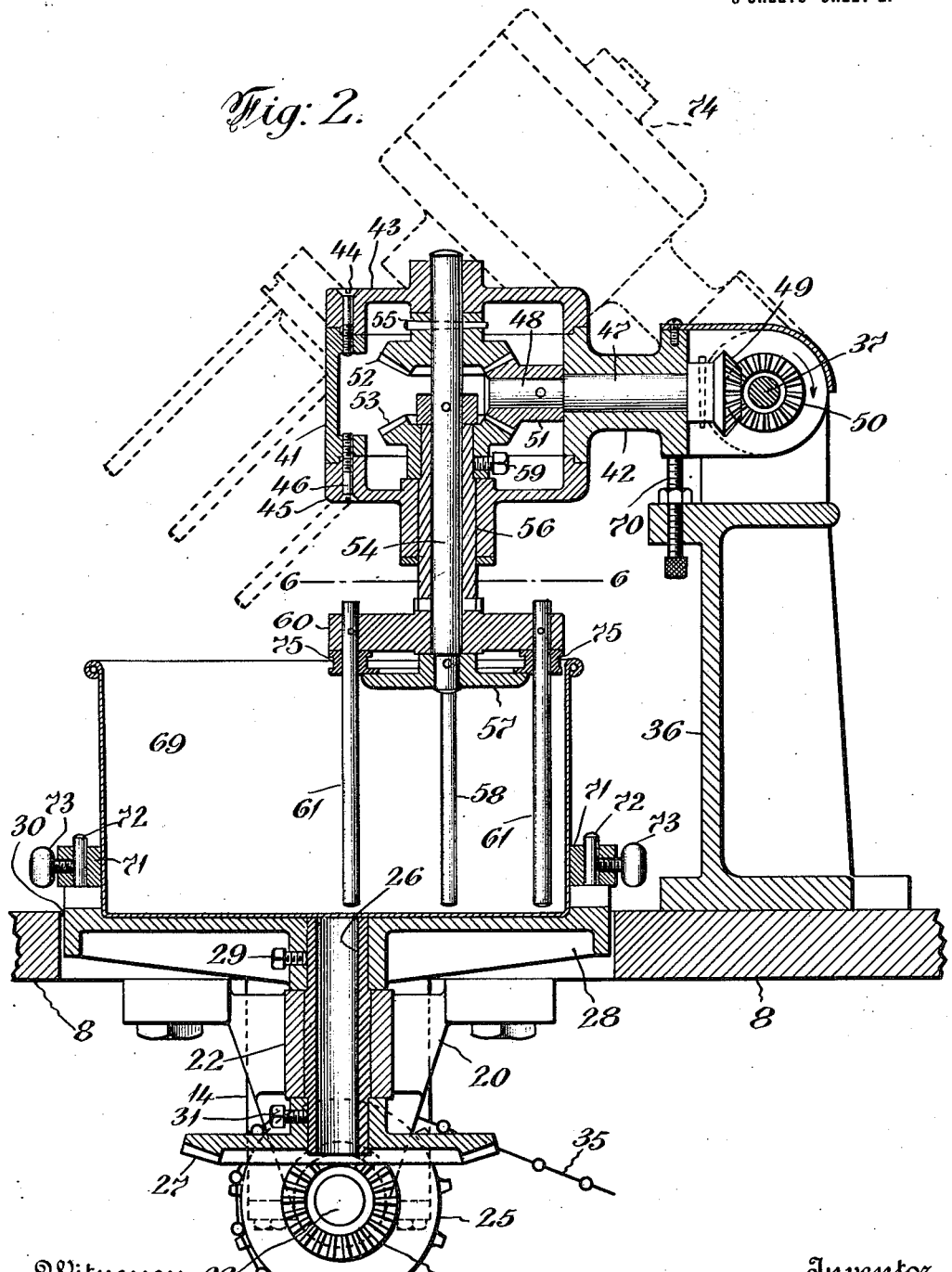
Fig. 2 is a detailed elevation in section on the line 2—2 of Fig. 4.

The dotted outline 74 in Fig. 2 illustrates the position of the casing 40 and the stirrers when in a raised position.

In operation the casing 40 with its attached stirring rods is placed in the position shown in Fig. 2. When the motor 13 revolves in the direction of the arrow, the cogged wheel 15 revolves as shown by the arrow and thus in turn revolves the cogged wheel 25 in the direction shown by the arrow, which revolves the platform 28 through the medium of the cogged wheels 32 and 25 and the meshed gears 24 and 27. At the same time the shaft 37 is revolved through the action of cogged wheels 33 and 38, and the revolution of the shaft 37 revolves the circular member 57 and the arm 60 in opposite directions through the medium of the meshed gears 51, 52 and 53, the revolution of the receptacle 69 being in an opposite direction to that of the arm 60.

The relative directions of revolution of the receptacle 69, and the circular stirrer 57 and the arm 60 are illustrated by the arrows in Fig. 6.

It is to be noted that the axis of rotation of the stirring members is not identical with the axis of rotation of the receptacle.

The circular member 57 may carry any desired number of stirrers, and the arm 60 may be branched into a form for carrying more than two stirrers.

I do not limit myself to the particular arrangement, shape, size or number of parts or to the particular means of transmission of power described above, all of which can be varied without going beyond the scope of my invention as described and claimed.

What is claimed, is:

1. In a mixing machine, in combination, a revoluble centrally unobstructed receptacle, means for revolving said receptacle, a plurality of concentric heads, mixing elements depending from said heads, means for revolving said heads, the axis of rotation of the receptacle being different from the axis of rotation of the heads.

2. In a mixing machine, in combination, a revoluble centrally unobstructed receptacle, means for revolving said receptacle, a series of stirring elements revoluble within the receptacle, a stirring element concentric to and revoluble within the series of stirring elements, means for revolving said stirring elements, the axis of rotation of the receptacle being different from the axis of rotation of the stirring elements.

3. In a mixing machine, in combination, a revoluble centrally unobstructed receptacle, means for revolving said receptacle, a series of stirring elements revoluble within the receptacle, a stirring element revoluble in opposite direction to and within said series of stirring elements, means for revolving the stirring elements, the axis of the receptacle being different from the axis of rotation of the stirring elements.

4. In a dough mixing machine, in combination, a revoluble centrally unobstructed receptacle, means for revolving said receptacle, a series of stirring rods revoluble within the receptacle, a stirring rod revoluble in counterdirection to and within the cycle of revolution of the series of stirring rods and within the receptacle, a free passage being maintained between the lower end of each stirring rod and the bottom of the receptacle, means for revolving the stirring rods, the axis of rotation of the receptacle being different from the axis of rotation of the stirring rods.

5. In a dough mixing machine, in combination, a revoluble platform, means for revolving said platform, a centrally unobstructed receptacle removably attached to said platform, a series of stirring rods revoluble within the receptacle, a stirring rod revoluble in counterdirection to and within the cycle of revolution of the series of stirring rods and within the receptacle, a free passage being maintained between the lower end of each of the stirring rods and the bottom of the receptacle, means for revolving the stirring rods, the axis of rotation of the receptacle being different from the axis of rotation of the stirring rods, and means for preventing dough from reaching the bearings.

6. In a dough mixing machine, in combination, a revoluble centrally unobstructed receptacle, means for revolving said receptacle, a series of stirring rods within the receptacle, one stirring rod revoluble within the cycle of revolution of the series of stirring rods and within the receptacle, a free passage being maintained between the lower end of each stirring rod and the bottom of the receptacle, said stirring rods being revoluble within the receptacle on an axis of rotation different from the axis of rotation of the receptacle, and means for preventing dough from reaching the bearings.

7. In a dough mixing machine, in combination, a revoluble centrally unobstructed receptacle, means for revolving said receptacle, a series of stirring rods within the receptacle, one stirring rod revoluble within the cycle of revolution of the series of stirring rods and within the receptacle, a free passage being maintained between the lower end of each stirring rod and the bottom of the receptacle, means for removing the stirring rods from the receptacle, said stirring rods being revoluble within the receptacle on an axis of rotation different from the axis of rotation of the receptacle, and means for preventing dough from reaching the bearings.

JOSEPH P. BACHMAN.

Witnesses:
 CHARLES C. HOSBACH,
 JACOB TANNENBAUM.